P. F. WILLIAMS.
GROUND PIPE CAP.
APPLICATION FILED APR. 15, 1908.
937,130.
Patented Oct. 19, 1909.
2 SHEETS—SHEET 1.
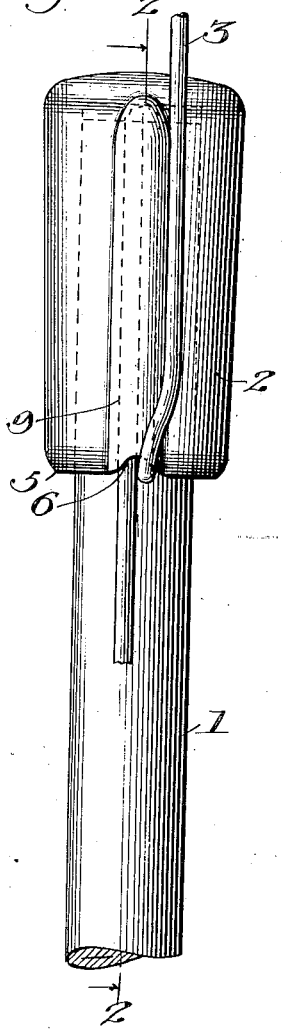
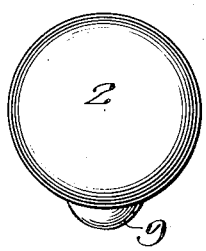
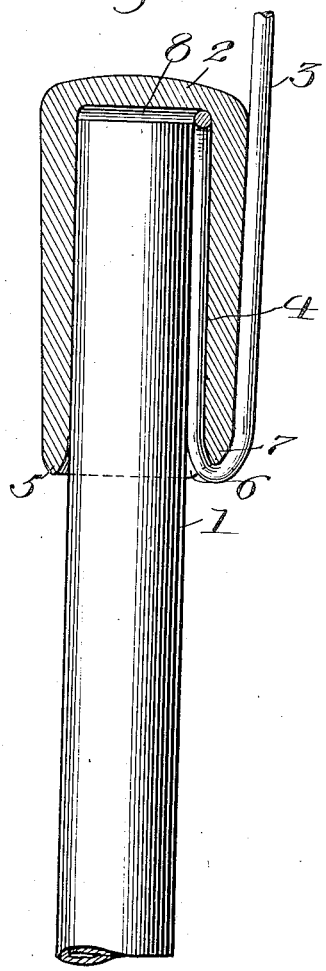
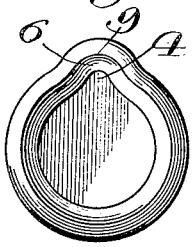
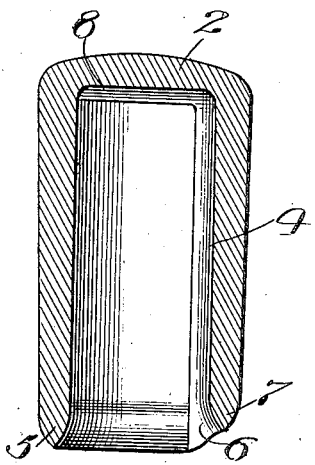
Witnesses:
Inventor
Paul F. Williams

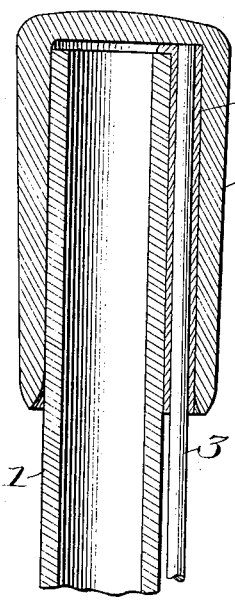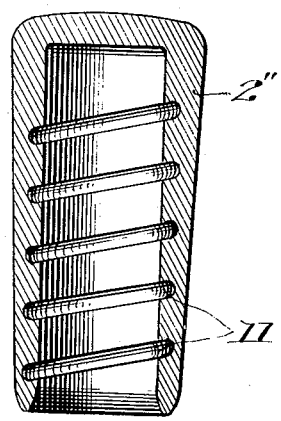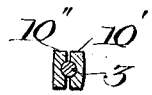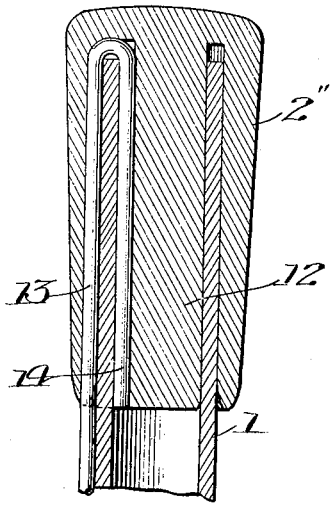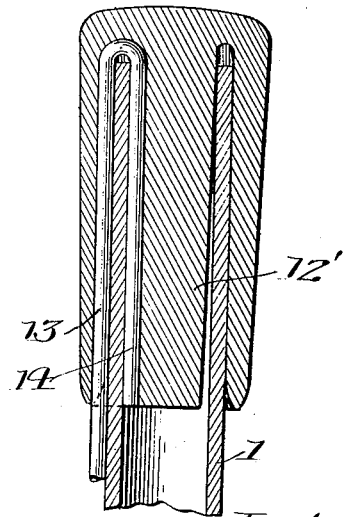

UNITED STATES PATENT OFFICE.

PAUL F. WILLIAMS, OF CHICAGO, ILLINOIS.

GROUND-PIPE CAP.

937,130.

Specification of Letters Patent.   Patented Oct. 19, 1909.

Application filed April 15, 1908.   Serial No. 427,275.

*To all whom it may concern:*

Be it known that I, PAUL F. WILLIAMS, a citizen of the United States, residing at Chicago, in the county of Cook and State of Illinois, have invented a certain new and useful Improvement in Ground-Pipe Caps, of which the following is a full, clear, concise, and exact description, reference being had to the accompanying drawings, forming a part of this specification.

My invention relates to ground pipe caps, and its object is to provide a simple, practical, inexpensive and durable construction of ground pipe cap, by which a ground pipe for overhead wire poles can be readily driven into the ground, and at the same time the connection can be easily and efficiently made between the ground pipe and a ground wire which is to be extended up the pole to afford a ground connection.

In the arrangement herein set forth for carrying out my invention, I provide a cap of suitable material; as for example, cast-iron, which is adapted to fit the upper end of the ground pipe and so permit the cap to be hammered to drive the pipe into the ground. The cap is also provided with a space of some sort, capable of accommodating a wire when the cap is placed upon the top of the pipe, and fitting so closely upon the wire that a tight joint or connection is made between the wire and pipe. In the accompanying drawings, I have shown several different forms, or types, of cap, capable of bringing about this result. In some of them I have a straight groove for accommodating the wire, while in another form I have a spiral groove for the same. In certain forms I have a centrally disposed plug-shaped member, which is capable of fitting into the interior of the ground pipe when the cap is placed on the end of the same.

Referring more particularly to these figures, Figure 1 is an elevation of a ground pipe, having a cap embodying my present invention, together with a ground wire, connected with said pipe by said cap. Fig. 2 is a vertical section taken on line 2, 2 in Fig. 1. Fig. 3 is a vertical section of a cap removed from the pipe. Fig. 4 is a top plan, and Fig. 5 is a bottom view of the cap. Figs. 6, 7, 8 and 9 are vertical sections of modified forms of caps, embodying the invention. Fig. 10 is a detail of the form of cap shown in Fig. 6.

Referring first to the form of device shown in Figs. 1 to 5 inclusive, I have shown a ground pipe 1 and cap 2, serving as a means for permitting or facilitating the drawing of the pipe 1 into the ground, and a ground wire 3 connected with the ground pipe 1 by the cap 2. The pipe 1 is understood to be any form of ground pipe, such as an iron or steel gas-pipe or the like, and the cap 2 is made of suitable material, preferably cast-iron. The wire 3 is any desired form of ground wire, such as a bare conductor. The cap 2 has a suitable exterior form, and has a bore substantially the size of the pipe 1, so as to fit snugly upon the upper end of said pipe. The cap is provided with a longitudinally extending side groove 4, adapted to receive and accommodate the ground wire 3. The lower edge, or rim, 5, of the cap 2 is desirably rounded, as shown in Figs. 2 and 3, so as to permit the pipe to be worked as the cap descends, and the lower end of the groove 4 is slightly flared and enlarged at its lower end, as shown at 6, at which point also the lower edge or rim of the cap is shortened or cut away, as shown at 7, Figs. 1, 2 and 3, whereby the wire is prevented from being torn or cut as the cap is driven down upon the pipe. The cap is also desirably provided with a transversely extending groove 8 at its upper end, capable of receiving the ground wire 3. Thus the end of the ground wire can enter this groove 8, should the portion of the wire inside the cap be forced upwardly by the driving of the cap upon the ground pipe. This form of cap can be readily and conveniently made by casting it in the form shown, in which there is a slight side enlargement 9, forming the side groove 4.

In Fig. 6 I have shown a cap 2' of simple form, having a side clamp member 10, capable of receiving the ground wire 3. This clamp member 10 is conveniently formed of two pieces 10' 10'', Fig. 10, having grooves to form a channel for the ground wire. As the cap is driven upon the ground pipe, the clamping member becomes tightened, so as to firmly grasp the wire between its members.

In Fig. 7 I have shown a simple form of cap 2'', having a spiral groove 11, capable of receiving the coiled or spiraled end of the ground wire.

In Fig. 8 I have shown a cap 2''', having a central plug member 12, capable of entering the upper end of the pipe 1. One side of the cap and the adjacent side of the plug 12 are provided with longitudinally extending groove 13 and 14, capable of receiving the ground wire and making tight connection with same. In Fig. 9 I have shown a quite similar construction, except that there is a center plug 12′, which is slightly tapering, whereas the plug 12 of the device of Fig. 8 is not tapering.

Thus it will be seen that by my invention I provide a device which can be applied to the upper end of a ground pipe, and when so applied the pipe can be driven into the ground without injuring it, and with more convenience and effectiveness than if the pipe itself were struck. At the same time the connection is made between the ground wire and the pipe, and this connection is tight, effective and efficient. I have shown several styles of cap for accomplishing this, and it will be understood that various other styles or types can be designed and made without departing from the spirit of the invention.

What I claim is:

1. A device of the class specified, comprising a cap capable of fitting upon the upper end of a ground pipe, and having a space or recess adapted to accommodate the end portion of a ground wire, whereby the pipe can be driven into the ground and connection made between it and the ground wire at the same time.

2. Means for connecting a conductor to a pipe or similar device, comprising a cap adapted to fit upon and slide down the end portion of the pipe, and having a space to receive the conductor and bind it to the pipe when the cap is slid upon the latter.

3. Means for connecting a conductor to a pipe or the like, comprising a cap adapted to fit and slide upon the end portion of the pipe or device, and having a groove sufficiently large to accommodate a loop portion of the conductor.

4. A device of the class specified, comprising a cap capable of fitting upon the upper end of a ground pipe and having a longitudinally extending side groove, the lower edge of the cap being rounded and being cut away at the lower end of said side groove.

5. A device of the class specified comprising a cap adapted to fit and slide upon the pipe and having space to accommodate the conductor to cause such conductor to be bound against the pipe when the cap is slid down over the same, the cap also having a tongue arranged to fit within the interior of the pipe.

In witness whereof, I hereunto subscribe my name this tenth day of April A. D., 1908.

PAUL F. WILLIAMS.

Witnesses:
A. MILLER BELFIELD,
C. B. CAMPBELL.